US000002049P2

(19) United States

(12) Statutory Invention Registration (10) Reg. No.: US H2049 H

Sathish et al. (43) Published: Oct. 1, 2002

(54) DIFFERENTIAL PROPERTY SENSITIVE ACOUSTIC LENS

(75) Inventors: Shamachary Sathish, Bellbrook; Mark J. Ruddell, Dayton; Robert L. Crane, Kettering, all of OH (US)

(73) Assignee: The United States of America as represented by the Secretary of the Air Force, Washington, DC (US)

(21) Appl. No.: 09/478,562

(22) Filed: Jan. 6, 2000

Related U.S. Application Data

(63) Continuation of application No. 09/140,057, filed on Aug. 24, 1998, now abandoned.

(51) Int. Cl.[7] ..... G01N 29/00

(52) U.S. Cl. ..... 73/642; 181/176; 310/335; 367/150; 600/472

(58) Field of Search ..... 73/606, 607, 632, 73/641, 643, 626, 627, 629, 861.18, 861.25, 602, 642; 181/175, 176, 284; 367/11, 13, 7, 8, 150; 310/335; 600/472

(56) References Cited

U.S. PATENT DOCUMENTS 4,852,575 A * 8/1989 Nikoonahad ..... 73/861.25
4,881,618 A * 11/1989 Tateoka et a. ..... 181/176
4,967,873 A * 11/1990 Hacchow et al. ..... 181/176
5,094,108 A * 3/1992 Kim et al. ..... 73/627

* cited by examiner

*Primary Examiner*—Daniel T. Pihulic

(74) *Attorney, Agent, or Firm*—Bobby D. Scearce; Thomas L. Kundert

(57) ABSTRACT

A differential property sensitive acoustic lens for non-destructive materials evaluation is described which in a preferred embodiment comprises first and second substantially semicylindrical shaped portions of fused silica disposed in closely spaced relationship along an axial plane, a substantially spherical depression defined in one end of each semicylindrical portion and a flat defined on each semicylindrical portion at the other end, a piezoelectric transducer attached to the flat of each semicylindrical portion, and a paraffin coated aluminum film of preselected thickness disposed between and in laminar contact with the semicylindrical portions for preventing acoustic and electrical cross talk between the transducers and between the semicylindrical portions.

6 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

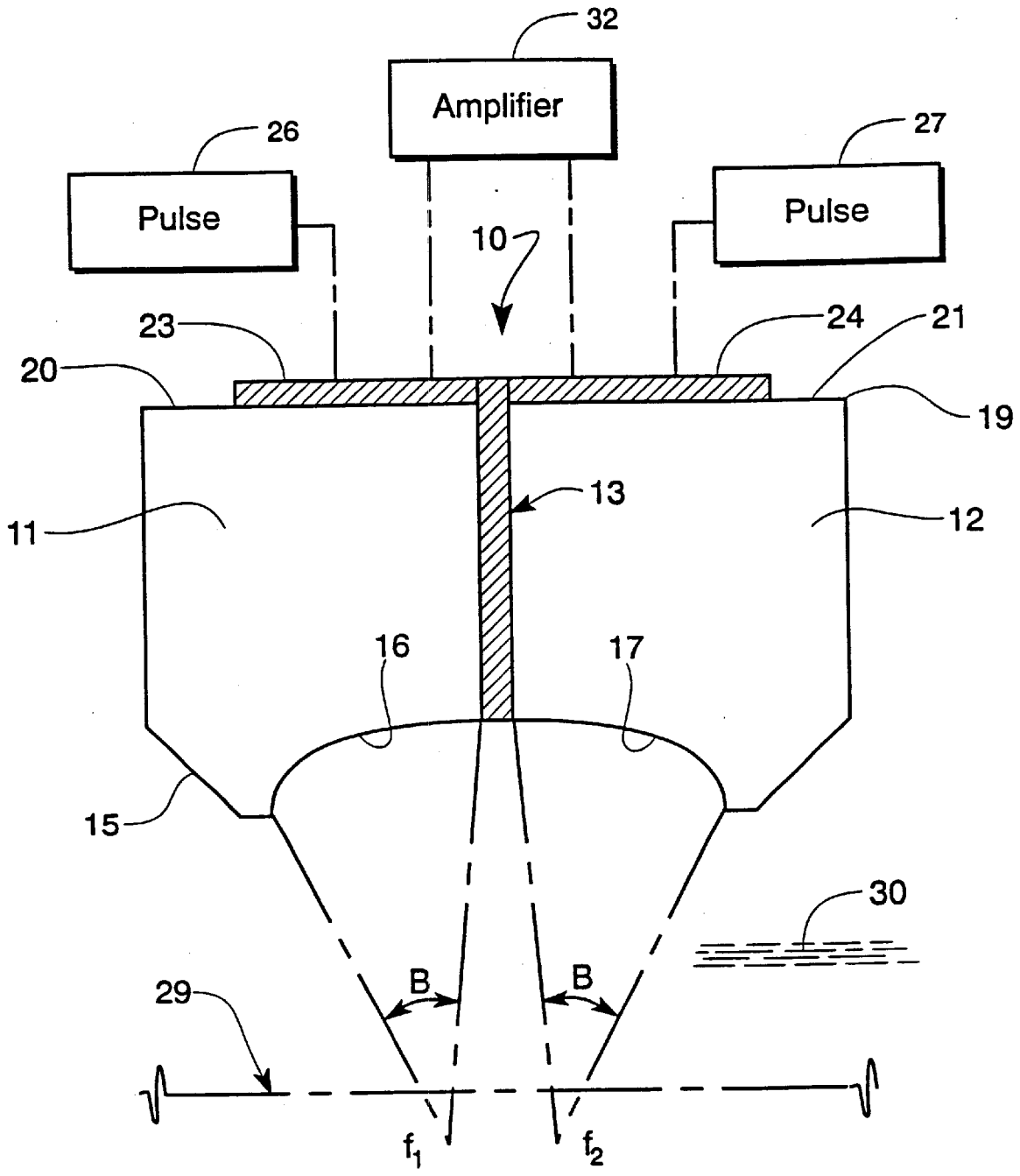
32
Amplifier
26
Pulse
27
Pulse
10
23
24
21
20
19
13
11
12
16
17
15
30
B
B
29
$f_1$
$f_2$

DIFFERENTIAL PROPERTY SENSITIVE ACOUSTIC LENS

This application is a continuation of application No. 09/140,057, filed Aug. 24, 1998 now abandoned.

RIGHTS OF THE GOVERNMENT

The invention described herein may be manufactured and used by or for the Government of the United States for all governmental purposes without the payment of any royalty.

BACKGROUND OF THE INVENTION

The present invention relates generally to acoustic systems and methods for non-destructive evaluation of materials, and more particularly to scanning acoustic microscopy of materials utilizing a differential property sensitive acoustic lens.

A scanning acoustic microscope (SAM) is used effectively for evaluating elastic properties of materials in the microscopic non-destructive inspection of materials. The conventional SAM includes an acoustic lens consisting essentially of a single spherical concave surface ground at one flat end of a cylindrical rod and a piezoelectric transducer attached to the other flat end of the rod. The concavity of the lens is filled with or immersed in a coupling fluid contacting a sample of the material under evaluation. A radio frequency signal excites the transducer and produces acoustic waves which propagate along the rod and converge to a diffraction limited spot on or just below the surface of the sample. The coupling fluid (usually water, oil, gel, alcohol, methanol, mercury, liquid helium or a solid coupler) transmits the acoustic waves from the rod at the lens into the sample. A signal reflected by the surface or an anomaly inside the sample is transmitted back through the coupling fluid and is propagated back to the transducer. A single transducer may be used to transmit and receive signals. The sample is scanned using mechanical scanning means, and the signals are electronically processed and an acoustic image is constructed point by point in a raster pattern which is recorded or displayed on a monitor.

Contrasts in the observed acoustic images can be related to local differences in elastic properties of the material. Contrast enhancement is achieved by modifying the acoustic lens to include angles large enough to generate surface acoustic waves (SAW) on the sample. The SAWs are scattered by surface inhomogeneities and contribute extra signals to the transducer and thereby enhance image contrast. Large opening angle (30 to 60°) lenses are routinely used in the SAM procedure for surface defect characterization. Although SAWs enhance the detectability of surface and near surface defects, there is a substantial reduction in the subsurface defect detection capability of the SAM procedure, because the SAWs carry away a large portion of the incident acoustic energy and leave only a small amount of energy to propagate into the sample for internal flaw detection. Acoustic transducers with small opening angles (5 to 20°) are therefore typically used in subsurface imaging applications, but surface and subsurface images with large contrast are difficult to obtain using small opening angles. Contrast enhancement may also be achieved by performing differential amplitude and differential phase imaging on the sample. Usually, in conventional acoustic microscopes as well as in C-Scan, only the amplitude of the reflected signal is used, and the phase information is often not detected and is usually discarded. An important difficulty with acoustic differential amplitude or acoustic phase imaging is the inability to extract a reference signal from a spot close to the region of interest on the sample.

The invention solves or substantially reduces in critical importance problems with prior art SAM systems and procedures as just described by providing a differential property sensitive acoustic lens for use in nondestructive materials evaluation. A SAM incorporating the lens of the invention explicitly permits measurement of acoustic signal phase information as well as signal amplitude in an acoustic image, which results in enhanced characterization of the material sample under examination by providing both differential amplitude and differential phase imaging of the sample. No known art exists for differential acoustic property measurements using a simple acoustic lens. The invention allows very sensitive measurement of local variations in acoustic properties and enhanced detectability of physical defects in the sample.

It is therefore a principal object of the invention to provide an improved non-destructive acoustic materials evaluation system.

It is another object of the invention to provide an improved SAM system and method.

It is a further object of the invention to provide an improved acoustic lens for use in a SAM.

It is yet another object of the invention to provide a differential property sensitive acoustic lens for non-destructive materials evaluation using a SAM.

These and other objects of the invention will become apparent as a detailed description of representative embodiments proceeds.

SUMMARY OF THE INVENTION

In accordance with the foregoing principles and objects of the invention, a differential property sensitive acoustic lens for non-destructive materials evaluation is described which in a preferred embodiment comprises first and second substantially semicylindrical shaped portions of fused silica disposed in closely spaced relationship along an axial plane, a substantially spherical depression defined in one end of each semicylindrical portion and a flat defined on each semicylindrical portion at the other end, a piezoelectric transducer attached to the flat of each semicylindrical portion, and a paraffin coated aluminum film of preselected thickness disposed between and in laminar contact with the semicylindrical portions for preventing acoustic and electrical cross talk between the transducers and between the semicylindrical portions.

DESCRIPTION OF THE DRAWINGS

The invention will be more clearly understood from the following detailed description of representative embodiments thereof read in conjunction with the accompanying drawing which includes a diagram in axial section of a split aperture acoustic lens of the invention.

DETAILED DESCRIPTION

Referring now to the drawing, shown therein is a diagram in axial section of a representative split aperture acoustic lens 10 according to the invention. Lens 10 comprises a substantially cylindrically shaped structure formed by the assembly of two semicylindrical portions 11,12 disposed in closely spaced relationship substantially along an axial plane with a paraffin wax coated aluminum film 13 of preselected thickness disposed between and in laminar contact with portions 11,12 along the axial plane. Other materials such as copper coated rubber, polymer coated metal, or other polymer coated acoustically attenuative structure or material may also be used, the specific materials not considered limiting of the invention, so long as the purpose thereof hereinbelow stated is served. In a preferred structure for lens 10, portions 11,12 comprise fused silica, although other materials as would occur to the skilled artisan guided by these teachings may be used including quartz, silicon, sapphire or aluminum. At one end 15 of lens 10 each portion 11,12 is ground in the shape of spherical shaped depressions 16,17 for focusing acoustic waves passing through lens 10. At the other end 19 of lens 10, each portion 11,12 is polished flat. To polished flats 20,21, respective piezoelectric transducers 23,24 are attached by any suitable means, such as by vapor deposition or physical contact adhesive or oils, grease or other acoustic couplant for coupling acoustic energy across the interfaces between flats 20,21 and transducers 23,24. The total thickness of film 13 is chosen so that no acoustic or electrical cross talk occurs between transducers 23,24 and between lens portions 11,12, and so that an appropriate preselected spacing is defined between the respective foci of depressions 16,17.

Lens 10 may have any size suitable for incorporation into an acoustic microscope system. In a system built and operated in demonstration of the invention, lens 10 had an overall diameter of about 0.8 inch and length of about 1.5 inches. In most systems in which lens 10 may be included, the diameter will typically be about 0.5 to 2.5 inches and length about 0.5 to 5 inches. The radius of curvature of depressions 16,17 will ordinarily be in the range of about zero to about 0.5 inch with a total solid angle B defined by each portion 11,12 being in the range of about 5 to 60° and defining a focal length of about 30 microns to 4 inches. Operating frequency of a system incorporating lens 10 may range from about 1 to 2000 MHz. The demonstration system operated at 10 MHz.

In the operation of an acoustic microscope into which lens 10 of the invention is included, transducers 23 and 24 are excited by separate electronic pulse generating circuits 26,27 in order to produce two separate acoustic waves propagating along the length of lens 10 and being focused by respective lens portions 11,12 as two semicircular spots on or on the surface of sample 29 near respective foci $f_1$ and $f_2$. Water was used as the coupling fluid 30 in the demonstration system, although other fluids as listed above may be used. Separation of lens portions 11,12 defined by the thickness of wax coated film 13 defines the separation between the respective spots near foci $f_l$ and $f_2$ and is related to the corresponding spatial resolution of lens 10. In the demonstration system, film 13 was about 75 microns thick defining a separation between $f_1$ and $f_2$ of about 180 microns. Signals reflected from sample 29 are received by transducers 23,24 after reflection through coupling fluid (water) 30 and lens 10. Because both acoustic beams propagate through the same material and along the same distance and reflect from regions adjacent to each other on or on the surface of sample 29, one of the beams can be used as a reference beam and the other as a probe beam. The reflected signals are captured, time gated and passed to differential amplifier 32 to obtain differential amplitude or phase signals at the region of sample 29 under inspection. A differential phase signal is acquired by passing the signals through a phase sensitive detector. A differential amplitude or phase acoustic image is obtained by raster scanning lens 10 over sample 29.

To obtain differential acoustic images of the interior of sample 29, the signal returning to the transducer after passing through the sample is utilized. Two time gates (not shown in the drawing), one on each returning signal reaching transducers 23,24, are placed such that they are at the same depth from the top surface of sample 29. Because the gated signals are from regions adjacent each other in the interior of sample 29 and propagate the same paths, one signal can be used as a reference beam and differential amplitude and differential phase images of the sample 29 interior can be obtained.

The invention as just described may be used to examine two closely spaced points in a sample lying in a common plane. It is noted, however, that in order to examine points that lie at different depths in a sample, the two lens portions 11,12 will have different focal lengths, which embodiment is contemplated herein. Further, and for specialized applications, the lens portions may be ground to an ellipsoidal shape or ground with a preselected degree of astigmatism. These arrangements are considered to be within the scope of these teachings and of the appended claims.

The invention therefore provides a differential property sensitive acoustic lens for nondestructive materials evaluation using acoustic microscopy. It is understood that modifications to the invention may be made as might occur to one skilled in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

We claim:

1. An acoustic lens for generating acoustic waves and transmitting the waves into a specimen of material and focusing the waves below the surface of the specimen in the nondestructive evaluation of the specimen, comprising:

(a) a substantially cylindrically shaped structure having first and second ends, said structure formed by the assembly of first and second substantially semicylindrical portions disposed in closely spaced relationship along an axial plane of said semicylindrical portions;

(b) a substantially spherical depression defined in each of said semicylindrical portions at said first end of said structure, each said spherical depression defining an acoustic lens of a preselected focal length, and a flat defined on each of said semicylindrical portions at said second end of said structure;

(c) first and second piezoelectric transducers attached to respective said first and second semicylindrical portions at said second end of said structure, said transducers configured for generating acoustic waves along said first and second semicylindrical portions and into a specimen of material, whereby the acoustic waves generated thereby are focused by said spherical depressions in said first and second semicylindrical portions at respective distinctly different and spatially separated focal points below the surface of the specimen; and (d) a film of preselected thickness disposed between and in laminar contact with said first and second semicylindrical portions along said axial plane for preventing acoustic and electrical cross talk between said transducers and between said semicylindrical portions.

2. The lens of claim 1 wherein said first and second semicylindrical portions comprise a material selected from the group consisting of fused silica, quartz, silicon, sapphire and aluminum.

3. The lens of claim 1 wherein said film is paraffin wax coated aluminum, or copper coated rubber or a polymer coated metal.

4. The lens of claim 1 wherein said semicylindrical portions have an overall diameter of about 0.5 to 2.5 inches and a length about 0.5 to 5 inches.

5. The lens of claim 1 wherein a radius of curvature of each said spherical depression is in the range of about 0 to about 0.5 inch.

6. The lens of claim 5 wherein said the radius of curvature of one said spherical depression is different from that of the other said spherical depression.

* * * * *